(12) United States Patent
Sales Fernandez et al.

(10) Patent No.: US 12,331,172 B2
(45) Date of Patent: Jun. 17, 2025

(54) GLASS FIBER-REINFORCED THERMOPLASTIC POLYMER COMPOSITION

(71) Applicant: SABIC GLOBAL TECHNOLOGIES B.V., Bergen op Zoom (NL)

(72) Inventors: Jose Sales Fernandez, Maastricht (NL); Christianus Johannes Jacobus Maas, Rilland (NL); Hendrik Theodorus Van De Grampel, Mijnsheerenland (NL); Christelle Marie Hélène Grein, Aachen (DE); Rob Donners, Brunssum (NL); Curtis Steven Collar, Moorestown, NJ (US); Tariq Syed, Novi, MI (US); Marc Paul Loubele, Genk (BE)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 348 days.

(21) Appl. No.: 17/793,463

(22) PCT Filed: Jan. 27, 2021

(86) PCT No.: PCT/EP2021/051802
§ 371 (c)(1),
(2) Date: Jul. 18, 2022

(87) PCT Pub. No.: WO2021/156115
PCT Pub. Date: Aug. 12, 2021

(65) Prior Publication Data
US 2023/0064716 A1 Mar. 2, 2023

(30) Foreign Application Priority Data
Feb. 4, 2020 (EP) ..................................... 20155458

(51) Int. Cl.
C08J 3/20 (2006.01)
C08J 5/08 (2006.01)

(52) U.S. Cl.
CPC .................. *C08J 3/203* (2013.01); *C08J 5/08* (2013.01); *C08J 2323/12* (2013.01); *C08J 2323/14* (2013.01)

(58) Field of Classification Search
CPC ... C08K 3/013; C08J 3/203; C08J 5/08; C08J 2323/12; C08J 2323/14; B29B 9/06; B29B 15/122; B29B 9/14; B29B 9/16
See application file for complete search history.

(56) References Cited

U.S. PATENT DOCUMENTS

| 4,226,760 A * | 10/1980 | Feldman ............... C09B 67/006 |
| | | 523/526 |
| 5,998,029 A | 12/1999 | Adzima et al. |
| 2010/0271576 A1 | 10/2010 | Pauluth et al. |
| 2022/0348782 A1* | 11/2022 | Palmer ..................... C09D 7/63 |

FOREIGN PATENT DOCUMENTS

| CN | 110016182 A | 7/2019 |
| EP | 0206189 A1 | 12/1986 |
| EP | 0397505 A2 | 11/1990 |
| EP | 1460166 A1 | 9/2004 |
| WO | 9806551 A2 | 2/1998 |
| WO | 2009028878 A1 | 3/2009 |
| WO | 2009080281 A1 | 7/2009 |
| WO | 2014053590 A1 | 4/2014 |
| WO | 2015062825 A1 | 5/2015 |

OTHER PUBLICATIONS

International Search Report for the corresponding International Application No. PCT/EP2021/051802; International Filing Date: Jan. 27, 2021; Date of Mailing: Feb. 22, 2021; 4 pages.
Written Opinion for the corresponding International Application No. PCT/EP2021/051802; International Filing Date: Jan. 27, 2021; Date of Mailing: Feb. 22, 2021; 5 pages.

* cited by examiner

*Primary Examiner* — Elizabeth M Imani
(74) *Attorney, Agent, or Firm* — CANTOR COLBURN LLP

(57) ABSTRACT

The invention relates to a glass fiber-reinforced thermoplastic polymer composition comprising a sheathed continuous multifilament strand comprising a core that extends in the longitudinal direction and a polymer sheath which intimately surrounds said core, wherein the core comprises an impregnated continuous multifilament strand comprising at least one continuous glass multifilament strand, wherein the at least one continuous glass multifilament strand is impregnated with an impregnating agent, wherein the polymer sheath consists of a thermoplastic polymer composition comprising a thermoplastic polymer, wherein the glass fiber-reinforced thermoplastic polymer composition comprises a liquid color composition comprising a pigment and a liquid carrier comprising a dicarboxylic acid ester and/or an unsaturated long-chain aliphatic fatty acid having 13 to 21 carbon atoms.

20 Claims, No Drawings

GLASS FIBER-REINFORCED THERMOPLASTIC POLYMER COMPOSITION

CROSS-REFERENCE TO RELATED APPLICATIONS

This application is a National Stage application of PCT/EP2021/051802, filed Jan. 27, 2021, which claims benefit of European Application No. 20155458.1 filed on Feb. 4, 2020, both of which are incorporated by reference herein in their entirety.

The present invention relates to a glass fiber-reinforced thermoplastic polymer composition and a process for producing such composition.

A glass fiber-reinforced thermoplastic polymer composition can be made by a process comprising subsequent steps of unwinding from a package of a continuous glass multifilament strand and applying a sheath of polypropylene around said multifilament strand to form a sheathed continuous multifilament strand.

Such process is known from International application WO 2009/080281. This published patent application discloses a process for producing a long glass fiber-reinforced thermoplastic polymer composition, which comprises the subsequent steps of i) unwinding from a package of at least one continuous glass multifilament strand, ii) applying an impregnating agent to said at least one continuous glass multifilament strand to form an impregnated continuous multifilament strand, and iii) applying a sheath of thermoplastic polymer around the impregnated continuous multifilament strand to form a sheathed continuous multifilament strand.

It is desirable that a moulded article made from a glass fiber-reinforced thermoplastic polymer composition has a good visual appearance such as an appearance without white spots. White spots may occur due to an insufficient dispersion of the fibers in the article.

It is an objective of the present invention to provide a glass fiber-reinforced thermoplastic polymer composition in which the above-mentioned and/or other needs are met.

Accordingly, the invention provides a glass fiber-reinforced thermoplastic polymer composition comprising a sheathed continuous multifilament strand comprising a core that extends in the longitudinal direction and a polymer sheath which intimately surrounds said core,
wherein the core comprises an impregnated continuous multifilament strand comprising at least one continuous glass multifilament strand, wherein the at least one continuous glass multifilament strand is impregnated with an impregnating agent,
wherein the polymer sheath consists of a thermoplastic polymer composition comprising a thermoplastic polymer,
wherein the glass fiber-reinforced thermoplastic polymer composition comprises a liquid color composition comprising a pigment and a liquid carrier comprising a dicarboxylic acid ester and/or an unsaturated long-chain aliphatic fatty acid having 13 to 21 carbon atoms.

In some embodiments, the thermoplastic polymer composition of the polymer sheath comprises the liquid color composition. In this case, the glass fiber-reinforced thermoplastic polymer composition according to the invention may typically be prepared by providing the thermoplastic polymer composition comprising the liquid color composition onto the core e.g. by an extruder. The glass fiber-reinforced thermoplastic polymer composition according to the invention may typically be in the form of pellets, which may typically be moded into an article by a suitable method such as injection molding.

In some embodiments, the glass fiber-reinforced thermoplastic polymer composition according to the invention comprises the sheathed continuous multifilament strand and further comprises the liquid color composition. In this case, the glass fiber-reinforced thermoplastic polymer composition according to the invention may typically be prepared by providing a sheathed continuous multifilament strand which does not comprise the liquid color composition and molding said sheathed continuous multifilament strand together with the liquid color composition into an article by a suitable method such as injection molding.

It was surprisingly found that a moulded article made from the glass fiber-reinforced thermoplastic polymer composition according to the invention has a good visual appearance in which white spots are reduced. Although not wishing to be bound by any theory, it is thought that the liquid color composition improves the dispersion of the multifilament strands in the article, which prevents the formation of white spots.

Preferably, the sheathed continuous multifilament strand is prepared by the sequential steps of
a) unwinding from a package of the at least one continuous glass multifilament strand,
b) applying the impregnating agent to the at least one continuous glass multifilament strand to form the impregnated continuous multifilament strand and
c) applying the sheath of the thermoplastic polymer composition around the impregnated continuous multifilament strand to form the sheathed continuous multifilament strand.

Steps a)-c) are described in detail in WO2009/080281A1, which document is hereby incorporated by reference.

The core of the sheathed continuous multifilament strand comprises an impregnated continuous multifilament strand, for example one or more impregnated continuous multifilament strands. Preferably, the one or more impregnated continuous multifilament strands form at least 90 wt %, more preferably at least 93 wt %, even more preferably at least 95 wt %, even more preferably at least 97 wt %, even more preferably at least 98 wt %, for example at least 99 wt % of the core. In a preferred embodiment, each core consists of the one or more impregnated continuous multifilament strands.

In the context of the invention with 'extends in the longitudinal direction' is meant 'oriented in the direction of the long axis of the sheathed continuous multifilament strand'.

The impregnated continuous multifilament strand is prepared from a continuous glass multifilament strand and an impregnating agent.

The term intimately surrounding as used herein is to be understood as meaning that the polymer sheath substantially entirely contacts the core. Said in another way the sheath is applied in such a manner onto the core that there is no deliberate gap between an inner surface of the sheath and the core containing the impregnated continuous mutifilament strands. A skilled person will nevertheless understand that a certain small gap between the polymer sheath and the glass filaments may be formed as a result of process variations. Preferably, therefore, the polymer sheath comprises less than 5 wt. % of said filament, preferably less than 2 wt. % of filament based on the total weight of the polymer sheath.

Preferably, the thickness of the polymer sheath in the sheathed continuous multifilament strand is between 200 and 2500 micrometer, preferably at least 500 micrometer, more preferably at least 1000 micrometer and at most 2000 micrometer.

Liquid Color Composition

The glass fiber-reinforced thermoplastic polymer composition comprises a liquid color composition comprising a pigment and a dicarboxylic acid ester.

Preferably, the amount of the liquid color composition in the glass fiber-reinforced thermoplastic polymer composition is 0.1 to 5.0 wt %, more preferably 0.3 to 4.0 wt %, more preferably 0.5 to 3.5 wt %, more preferably 1.0 to 3.0 wt %, with respect to the glass fiber-reinforced thermoplastic polymer composition.

In particularly preferred embodiments, the amount of the liquid color composition in the glass fiber-reinforced thermoplastic polymer composition is 1.5 to 3.0 wt % with respect to the glass fiber-reinforced thermoplastic polymer composition. It was observed that the white spots were substantially reduced.

Pigment

The pigment in the liquid color composition may be any known pigments of any color, preferably inorganic pigments. Examples of suitable pigments include carbon black.

Preferably, the amount of the pigment in the liquid color composition is 5 to 50 wt %, more preferably 10 to 30 wt %, with respect to the liquid color composition.

Liquid Carrier

Preferably, the amount of the liquid carrier in the liquid color composition is 50 to 95 wt %, more preferably 70 to 90 wt %, with respect to the liquid color composition. Preferably, the total amount of the pigment and the liquid carrier is 100 wt % with respect to the liquid color composition.

The composition of the liquid carrier may be determined e.g. by Thermal Conductivity Detector-Gas Chromatography/mass spectrometer (TDC-GC/MS).

The liquid carrier comprises a dicarboxylic acid ester and/or an unsaturated long-chain aliphatic fatty acid having 13 to 21 carbon atoms. The liquid carrier may further comprise a saturated long-chain aliphatic fatty acid having 13 to 21 carbon atoms.

Dicarboxylic Acid Ester

The dicarboxylic acid ester is liquid at room temperature, i.e. has a melting point of lower than 25° C. and functions as (a part of) the liquid carrier for the pigment.

Preferably, the dicarboxylic acid ester is selected from the group consisting of di-(2-propylheptyl)adipate, di-isononyladipate, di-(2-ethylhexyl)adipate (=DEHA), dipropylheptylphthalate and mixtures thereof.

Preferably, the dicarboxylic acid ester in the liquid color composition comprises di(2-ethylhexyl) adipate. The dicarboxylic acid ester in the liquid color composition may comprise 50 to 100 wt %, 60 to 100 wt %, 70 to 100 wt %, 80 to 90 wt %, or 95 to 100 wt % of di(2-ethylhexyl) adipate.

The dicarboxylic acid ester may have a kinematic viscosity according to DIN 51562-1 in the range of from 2 to 15 mm$^2$/s at 100° C.

Preferably, the dicarboxylic acid ester is the compound present in the liquid carrier at the largest amount. Preferably, the amount of the dicarboxylic acid ester in the liquid carrier is at least 10 wt %, for example at most 40 wt %, with respect to the liquid carrier.

Saturated Long-Chain Aliphatic Fatty Acid

Preferably, the liquid carrier further comprises a saturated long-chain aliphatic fatty acid having 13 to 21 carbon atoms. Suitable examples of the saturated long-chain aliphatic fatty acid include myristic acid, palmitic acid, stearic acid, arachic acid, and behenic acid. Preferably, the saturated long-chain aliphatic fatty acid comprises stearic acid.

Preferably, the amount of the saturated long-chain aliphatic fatty acid having 13 to 21 carbon atoms in the liquid carrier is at least 10 wt %, for example at most 30 wt %, with respect to the liquid carrier.

Unsaturated Long-Chain Aliphatic Fatty Acid

Preferably, the liquid carrier further comprises an unsaturated long-chain aliphatic fatty acid having 13 to 21 carbon atoms.

Suitable examples of the unsaturated long-chain aliphatic fatty acid include cis-13-octadecenoic acid and oleic acid. Preferably, the unsaturated long-chain aliphatic fatty acid comprises cis-13-octadecenoic acid.

Preferably, the amount of the unsaturated long-chain aliphatic fatty acid having 13 to 21 carbon atoms in the liquid carrier is at least 10 wt %, for example at most 30 wt %, with respect to the liquid carrier.

Preferably, the total amount of the dicarboxylic acid ester, the saturated long-chain aliphatic fatty acid having 13 to 21 carbon atoms and the unsaturated long-chain aliphatic fatty acid having 13 to 21 carbon atoms in the liquid carrier is at least 30 wt %, more preferably at least 35 wt %, more preferably at least 40 wt %, with respect to the liquid carrier The liquid carrier may further comprise saturated hydrocarbons, unsaturated hydrocarbons and alcohols having 12 or less carbon atoms.

Thermoplastic Polymer Composition of Polymer Sheath

The polymer sheath consists of a thermoplastic polymer composition. The thermoplastic polymer composition may or may not comprise the liquid color composition. Preferably, the melt flow rate (MFR) of the thermoplastic polymer composition is in the range from 20 to 150 dg/min, preferably in the range from 25 to 120 dg/min, for example in the range from 35 to 100 dg/min, for example in the range from 40 to 100 dg/min as measured according to ISO1133-1 (2.16 kg/230° C.).

Thermoplastic Polymer in Thermoplastic Polymer Composition of Polymer Sheath

The thermoplastic polymer composition comprises a thermoplastic polymer. Suitable examples of thermoplastic polymers include but are not limited to polyamide, such as polyamide 6, polyamide, 66 or polyamide 46; polyolefins, for example polypropylenes and polyethylenes; polyesters, such as polyethylene terephthalate, polybutylene terephthalate; polycarbonates; polyphenylene sulphide; polyurethanes and and mixtures thereof.

The thermoplastic polymer is preferably a polyolefin, more preferably a polyolefin chosen from the group of polypropylenes or elastomers of ethylene and α-olefin comonomer having 4 to 8 carbon atoms, and any mixtures thereof.

In one embodiment, preferably the thermoplastic polymer composition comprises at least 80 wt % of the thermoplastic polymer, for example at least 90 wt %, at least 93 wt %, at least 95 wt %, at least 97 wt % at least 98 wt % or at least 99 wt % of the thermoplastic polymer based on the thermoplastic polymer composition. In a special embodiment, the thermoplastic polymer composition consists of the thermoplastic polymer.

In another embodiment, the thermoplastic polymer composition comprises at least 60 wt %, for example at least 70 wt %, for example at least 75 wt % and/or at most 99 wt %, for example at most 95 wt %, for example at most 90 wt % of the thermoplastic polymer.

The polypropylene may for example be a propylene homopolymer or a random propylene copolymer or a heterophasic propylene copolymer.

A propylene homopolymer can be obtained by polymerizing propylene under suitable polymerization conditions. A propylene copolymer can be obtained by copolymerizing propylene and one or more other α-olefins, preferably ethylene, under suitable polymerization conditions. The preparation of propylene homopolymers and copolymers is, for example, described in Moore, E. P. (1996) Polypropylene Handbook. Polymerization, Characterization, Properties, Processing, Applications, Hanser Publishers: New York.

The random propylene copolymer may comprise as the comonomer ethylene or an α-olefin chosen from the group of α-olefins having 4 to 10 C-atoms, preferably ethylene, 1-butene, 1-hexene or any mixtures thereof. The amount of the comonomer is preferably at most 10 wt % based on the random propylene copolymer, for example in the range from 2-7 wt % based on the random propylene copolymer.

Polypropylenes can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

Heterophasic propylene copolymers are generally prepared in one or more reactors, by polymerization of propylene in the presence of a catalyst and subsequent polymerization of an ethylene-α-olefin mixture. The resulting polymeric materials are heterophasic, but the specific morphology usually depends on the preparation method and monomer ratios used.

The heterophasic propylene copolymers can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524.

Preferably, the heterophasic propylene copolymer is made using Ziegler-Natta catalyst.

The heterophasic propylene copolymer may be prepared by a process comprising
  polymerizing propylene and optionally ethylene and/or α-olefin in the presence of a catalyst system to obtain the propylene-based matrix and
  subsequently polymerizing ethylene and α-olefin in the propylene-based matrix in the presence of a catalyst system to obtain the dispersed ethylene-α olefin copolymer. These steps are preferably performed in different reactors. The catalyst systems for the first step and for the second step may be different or same.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The propylene-based matrix consists of a propylene homopolymer and/or a propylene copolymer consisting of at least 70 wt % of propylene monomer units and at most 30 wt % of comonomer units selected from ethylene monomer units and α-olefin monomer units having 4 to 10 carbon atoms, for example consisting of at least 80 wt % of propylene monomer units and at most 20 wt % of the comonomer units, at least 90 wt % of propylene monomer units and at most 10 wt % of the comonomer units or at least 95 wt % of propylene monomer units and at most 5 wt % of the comonomer units, based on the total weight of the propylene-based matrix.

Preferably, the comonomer in the propylene copolymer of the propylene-based matrix is selected from the group of ethylene, 1-butene, 1-pentene, 4-methyl-1-pentene, 1-hexen, 1-heptene and 1-octene, and is preferably ethylene.

Preferably, the propylene-based matrix consists of a propylene homopolymer.

The melt flow index (MFI) of the propylene-based matrix (before the heterophasic propylene copolymer is mixed into the composition of the invention), $MFI_{PP}$, may be for example at least 0.1 dg/min, at least 0.2 dg/min, at least 0.3 dg/min, at least 0.5 dg/min, at least 1 dg/min, at least 1.5 dg/min, and/or for example at most 50 dg/min, at most 40 dg/min, at most 30 dg/min, at most 25 dg/min, at most 20 dg/min, measured according to ISO1133 (2.16 kg/230° C.). The $MFI_{PP}$ may be in the range of for example 0.1 to 50 dg/min, for example from 0.2 to 40 dg/min, for example 0.3 to 30 dg/min, for example 0.5 to 25 dg/min, for example from 1 to 20 dg/min, for example from 1.5 to 10 dg/min, measured according to ISO1133 (2.16 kg/230° C.).

The propylene-based matrix may e.g. be present in an amount of 50 to 95 wt %. Preferably, the propylene-based matrix is present in an amount of 60 to 85 wt %, for example at least 65 wt % or at least 70 wt % and/or at most 78 wt %, based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM). The amount of the dispersed ethylene-α-olefin copolymer in the heterophasic propylene copolymer may herein be sometimes referred as RC.

The amount of ethylene monomer units in the ethylene-α-olefin copolymer may e.g. be 20 to 65 wt %. The amount of ethylene monomer units in the dispersed ethylene-α-olefin copolymer in the heterophasic propylene copolymer may herein be sometimes referred as RCC2.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexen, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

The MFI of the dispersed ethylene α-olefin copolymer (before the heterophasic propylene copolymer is mixed into the composition of the invention), MFIrubber, may be for example at least 0.001 dg/min, at least 0.01 dg/min, at least 0.1 dg/min, at least 0.3 dg/min, at least 0.7 dg/min, at least 1 dg/min, and/or for example at most 30 dg/min, at most 20 dg/min, at most 15 dg/min at most 10 dg/min, at most 5 dg/min or at most 3 dg/min. The MFIrubber may be in the range for example from 0.001 to 30 dg/min, for example from 0.01 to 20 dg/min, for example 0.1 to 15 dg/min, for example 0.3 to 10 dg/min, for example from 0.7 to 5 dg/min, for example from 1 to 3 dg/min. MFIrubber is calculated according to the following formula:

$$MFIrubber = 10^{\left(\frac{\text{Log } MFIheterophasic - \text{matrix content} * \text{Log } MFImatrix}{\text{rubber content}}\right)}$$

wherein
MFIheterophasic is the MFI (dg/min) of the heterophasic propylene copolymer measured according to ISO1133 (2.16 kg/230° C.),
MFImatrix is the MFI (dg/min) of the propylene-based matrix measured according to ISO1133 (2.16 kg/230° C.),
matrix content is the fraction of the propylene-based matrix in the heterophasic propylene copolymer,
rubber content is the fraction of the dispersed ethylene-α-olefin copolymer in the heterophasic propylene copolymer. The sum of the matrix content and the rubber content is 1. For the avoidance of any doubt, Log in the formula means $\log_{10}$.

The dispersed ethylene-α-olefin copolymer is present in an amount of 50 to 5 wt %. Preferably, the dispersed ethylene-α-olefin copolymer is present in an amount of 40 to 15 wt %, for example in an amount of at least 22 wt % and/or for example in an amount of at most 35 wt % or at most 30 wt % based on the total heterophasic propylene copolymer.

In the heterophasic propylene copolymer in the composition of the invention, the sum of the total weight of the propylene-based matrix and the total weight of the dispersed ethylene-α-olefin copolymer is 100 wt % of the heterophasic propylene copolymer.

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

The elastomer of ethylene and α-olefin comonomer having 4 to 8 carbon atoms may for example have a density in the range from 0.850 to 0.915 g/cm$^3$. Such elastomers are sometimes also referred to as plastomers.

The α-olefin comonomer in the elastomer is preferably an acyclic monoolefin such as 1-butene, 1-pentene, 1-hexene, 1-octene, or 4-methylpentene.

Accordingly, the elastomer is preferably selected from the group consisting of ethylene-1-butene copolymer, ethylene-1-hexene copolymer, ethylene-1-octene copolymer and mixtures thereof, more preferably wherein the elastomer is selected from ethylene-1-octene copolymer. Most preferably, the elastomer is an ethylene-1-octene copolymer.

Preferably, the density of the elastomer is at least 0.865 g/cm$^3$ and/or at most 0.910 g/cm$^3$. For example, the density of the elastomer is at least 0.850, for example at least 0.865, for example at least 0.88, for example at least 0.90 and/or for example at most 0.915, for example at most 0.910, for example at most 0.907, for example at most 0.906 g/cm$^3$. More preferable the density of the elastomer is in the range from 0.88 up to an including 0.907 g/cm$^3$, most preferably, the density of the elastomer is in the range from 0.90 up to and including 0.906 g/cm$^3$.

Elastomers which are suitable for use in the current invention are commercially available for example under the trademark EXACT™ available from Exxon Chemical Company of Houston, Texas or under the trademark ENGAGE™ polymers, a line of metallocene catalyzed plastomers available from Dow Chemical Company of Midland, Michigan or under the trademark TAFMER™ available from MITSUI Chemicals Group of Minato Tokyo or under the trademark Nexlene™ from SK Chemicals.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomer s may also be prepared using traditional types of heterogeneous multi-sited Ziegler-Natta catalysts.

Preferably, the elastomer has a melt flow index of 0.1 to 40 dg/min (ISO1133, 2.16 kg, 190° C.), for example at least 1 dg/min and/or at most 35 dg/min. More preferably, the elastomer has a melt flow index of at least 1.5 dg/min, for example of at least 2 dg/min, for example of at least 2.5 dg/min, for example of at least 3 dg/min, more preferably at least 5 dg/min and/or preferably at most 30 dg/min, more preferably at most 20 dg/min, more preferably at most 10 dg/min measured in accordance with ISO 1133 using a 2.16 kg weight and at a temperature of 190° C.

Preferably, the amount of ethylene incorporated into the elastomer is at least 50 mol %. More preferably, the amount of ethylene incorporated into the elastomer is at least 57 mol %, for example at least 60 mol %, at least 65 mol % or at least 70 mol %. Even more preferably, the amount of ethylene incorporated into the elastomer is at least 75 mol %. The amount of ethylene incorporated into the elastomer may typically be at most 97.5 mol %, for example at most 95 mol % or at most 90 mol %.

In some preferred embodiments, the thermoplastic polymer in the thermoplastic polymer composition is a mixture of a propylene homopolymer and a heterophasic propylene copolymer.

Other Additives in Thermoplastic Polymer Composition of Polymer Sheath

The thermoplastic polymer composition of the polymer sheath may contain other usual additives, for instance nucleating agents and clarifiers, stabilizers, release agents, fillers, peroxides, plasticizers, anti-oxidants, lubricants, antistatics, cross linking agents, scratch resistance agents, high performance fillers, impact modifiers, blowing agents, acid scavengers, recycling additives, coupling agents, anti-microbials, anti-fogging additives, slip additives, anti-blocking additives, polymer processing aids, flame retardants and the like. Such additives are well known in the art. The skilled person will know how to choose the type and amount of additives such that they do not detrimentally influence the aimed properties. In a special embodiment, the thermoplastic polymer composition consists of the thermoplastic polymer, the liquid color composition (if present) and additives other than the liquid color composition. The amount of the additives may e.g. be 0.1 to 5.0 wt % of the thermoplastic polymer composition.

Preferably, the amount of the thermoplastic polymer composition is 25 to 75 wt %, for example 25 to 45 wt %, 45 to 60 wt % or 60 to 75 wt %, with respect to the sheathed continuous multifilament strand.

Core

The sheathed continuous multifilament strand comprises a core that extends in the longitudinal direction. The core comprises an impregnated continuous multifilament strand comprising at least one continuous glass multifilament strand, wherein the at least one continuous glass multifilament strand is impregnated with an impregnating agent.

Glass Fibres of Core

Glass fibres are generally supplied as a plurality of continuous, very long filaments, and can be in the form of strands, rovings or yarns. A filament is an individual fibre of reinforcing material. A strand is a plurality of bundled filaments. Yarns are collections of strands, for example strands twisted together. A roving refers to a collection of strands wound into a package.

For purpose of the invention, a glass multifilament strand is defined as a plurality of bundled glass filaments.

Glass multifilament strands and their preparation are known in the art.

The filament density of the continuous glass multifilament strand may vary within wide limits. For example, the continuous glass multifilament strand may have at least 500, for example at least 1000 glass filaments/strand and/or at most 10000, for example at most 5000 grams per 1000 meter. Preferably, the amount of glass filaments/strands is in the range from 500 to 10000 grams per 1000 meterglass filaments/strand.

The thickness of the glass filaments is preferably in the range from 5 to 50 µm, more preferably from 10 to 30 µm, even more preferably from 15 to 25 µm. Usually the glass filaments are circular in cross section meaning the thickness as defined above would mean diameter. The glass filaments are generally circular in cross section.

The length of the glass filaments is in principle not limited as it is substantially equal to the length of the sheathed continuous multifilament strand. For practical reasons of being able to handle the strand however, it may be necessary to cut the sheathed continuous multifilament strand into a shorter strand. For example the length of the sheathed continuous multifilament strand is at least 1 m, for example at least 10 m, for example at least 50 m, for example at least 100 m, for example at least 250 m, for example at least 500 m and/or for example at most 25 km, for example at most 10 km.

Preferably, the continuous glass multifilament strand comprises at most 2 wt %, preferably in the range from 0.10 to 1 wt % of a sizing based on the continuous glass multifilament strand. The amount of sizing can be determined using ISO 1887:2014.

A sizing composition is typically applied to the glass filaments before the glass filaments are bundled into a continuous glass multifilament strand.

Suitable examples of sizing compositions include solvent-based compositions, such as an organic material dissolved in aqueous solutions or dispersed in water and melt- or radiation cure-based compositions. Preferably, the sizing composition is an aqueous sizing composition.

As described in the art, e.g. in documents EP1460166A1, EP0206189A1 or U.S. Pat. No. 4,338,233, the aqueous sizing composition may include film formers, coupling agents and other additional components.

The film formers are generally present in effective amount to protect fibres from interfilament abrasion and to provide integrity and processability for fibre strands after they are dried. Suitable film formers are miscible with the polymer to be reinforced. For example; for reinforcing polypropylenes, suitable film formers generally comprise polyolefin waxes.

The coupling agents are generally used to improve the adhesion between the matrix thermoplastic polymer and the fibre reinforcements. Suitable examples of coupling agents known in the art as being used for the glass fibres include organofunctional silanes. More particularly, the coupling agent which has been added to the sizing composition is an aminosilane, such as aminomethyl-trimethoxysilane, N-(beta-aminoethyl)-gamma-aminopropyl-trimethoxysilane, gamma-aminopropyl-trimethoxysilane gamma-methylaminopropyl-trimethoxysilane, delta-aminobutyl-triethoxysilane, 1,4-aminophenyl-trimethoxysilane. Preferably, the sizing composition contains an aminosilane to enable a good adhesion to the thermoplastic matrix. The sizing composition may further comprise any other additional components known to the person skilled in the art to be suitable for sizing compositions. Suitable examples include but are not limited to lubricants (used to prevent damage to the strands by abrasion) antistatic agents, crosslinking agents, plasticizers, surfactants, nucleation agents, antioxidants, pigments as well as mixtures thereof.

Typically, after applying the sizing composition to the glass filaments, the filaments are bundled into the continuous glass multifilament strands and then wound onto bobbins to form a package.

Preferably, the amount of glass filaments is 20 to 70 wt %, for example 20 to 35 wt %, 35 to 50 wt % or 50 to 70 wt %, with respect to the sheathed continuous multifilament strand. Since a higher concentration of the glass filaments generally results in more white spots, the effect of the present invention may be more pronounced when the concentration of the glass filaments is higher.

Coupling Agent

The impregnated continuous multifilament strand may comprise a coupling agent in the core as part of the sizing agent as described above. Alternatively, the impregnated continuous multifilament strand may comprise a coupling agent in the thermoplastic composition of the sheath.

Suitable examples of the coupling agent include those described above as well as. a functionalized polyolefin grafted with an acid or acid anhydride functional group. The polyolefin is preferably polyethylene or polypropylene, more preferably polypropylene. The polypropylene may be a propylene homopolymer or a propylene copolymer. The propylene copolymer may be a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix. Preferably, the α-olefin in the propylene-α-olefin copolymer is selected from the group of α-olefins having 2 or 4-10 carbon atoms and is preferably ethylene. Examples of the acid or acid anhydride functional groups include (meth)acrylic acid and maleic anhydride. A particularly suitable material is for example maleic acid functionalized propylene homopolymer (for example Exxelor PO 1020 supplied by Exxon).

The amount of the coupling agent may e.g. be 0.5 to 3.0 wt %, preferably 1.0 to 2.0 wt %, based on the sheathed continuous multifilament strand.

Impregnating Agent

The impregnated continuous multifilament strand is prepared from a continuous glass multifilament strand and an impregnating agent and in particular by applying an impregnating agent to the continuous glass multifilament strand preferably in an amount from 0.50 to 18.0 wt %, for example from 0.5 to 10.0 wt % or for example from 10.0 to 18.0 wt % based on the sheathed continuous multifilament strand.

The optimal amount of impregnating agent applied to the continuous glass multifilament strand depends on the polymer sheath, on the size (diameter) of the glass filaments forming the continuous glass strand, and on the type of sizing composition. Typically, the amount of impregnating agent applied to the continuous glass multifilament strand is for example at least 0.50 wt %, preferably at least 1.0 wt %, preferably at least 1.5 wt %, preferably at least 2 wt %, preferably at least 2.5 wt % and/or at most 10.0 wt %, preferably at most 9.0 wt %, more preferably at most 8.0 wt %, even more preferably at most 7.0 wt %, even more preferably at most 6.0 wt %, even more preferably at most 5.5 wt %, or for example at least 10.0 wt %, preferably at least 11 wt %, preferably at least 12 wt % and/or at most 18 wt %, preferably at most 16 wt %, preferably at most 14% based on the amount of sheathed continuous multifilament strand. Preferably, the amount of impregnating agent is in the range from 1.5 to 8 wt %, even more preferably in the range from 2.5 wt % to 6.0 wt % based on the sheathed continuous multifilament strand. A higher amount of impregnating agent increases the Impact Energy per unit of thickness (J/mm). However, for reasons of cost-effectiveness and low emissions (volatile organic compounds) and mechanical properties, the amount of impregnating agent should also not become too high.

For example, the ratio of impregnating agent to continuous glass multifilament strand is in the range from 1:4 to 1:30, preferably in the range from 1:5 to 1:20.

Preferably, the viscosity of the impregnating agent is in the range from 2.5 to 200 cSt at 160° C., more preferably at least 5.0 cSt, more preferably at least 7.0 cSt and/or at most 150.0 cSt, preferably at most 125.0 cSt, preferably at most 100.0 cSt at 160° C.

An impregnating agent having a viscosity higher than 100 cSt is difficult to apply to the continuous glass multifilament strand. Low viscosity is needed to facilitate good wetting performance of the fibres, but an impregnating agent having a viscosity lower than 2.5 cSt is difficult to handle, e.g., the amount to be applied is difficult to control; and the impregnating agent could become volatile. For purpose of the invention, unless otherwise stated, the viscosity of the impregnating agent is measured in accordance with ASTM D 3236-15 (standard test method for apparent viscosity of hot melt adhesives and coating materials, Brookfield viscometer Model RVDV 2, #27 spindle, 5 r/min) at 160° C.

Preferably, the melting point of (that is the lowest melting temperature in a melting temperature range) the impregnating agent is at least 20° C. below the melting point of the thermoplastic polymer composition. More preferably, the impregnating agent has a melting point of at least 25 or 30° C. below the melting point of the thermoplastic polymer composition. For instance, when the thermoplastic polymer composition has a melting point of about 160° C., the melting point of the impregnating agent may be at most about 140° C.

Suitable impregnating agents are compatible with the thermoplastic polymer to be reinforced, and may even be soluble in said polymer. The skilled man can select suitable combinations based on general knowledge, and may also find such combinations in the art.

Suitable examples of impregnating agents include low molar mass compounds, for example low molar mass oligomeric polyurethanes, polyesters such as unsaturated polyesters, polycaprolactones, polyethyleneterephthalate, poly (alpha-olefins), such as highly branched polyethylenes and polypropylenes, polyamides, such as nylons, and other hydrocarbon resins.

For reinforcing polypropylenes, the impregnating agent preferably comprises highly branched poly(alpha-olefins), such as highly branched polyethylenes, modified low molecular weight polypropylenes, mineral oils, such as, paraffin or silicon and any mixtures of these compounds.

The impregnating agent preferably comprises at least 20 wt %, more preferably at least 30 wt %, more preferably at least 50 wt %, for example at least 99.5 wt %, for example 100 wt % of a branched poly(alpha-olefin), most preferably a branched polyethylene. To allow the impregnating agent to reach a viscosity of from 2.5 to 200 cSt at 160° C., the branched poly(alpha-olefin) may be mixed with an oil, wherein the oil is chosen from the group consisting of of mineral oils, such as a paraffin oil or silicon oil; hydrocarbon oils; and any mixtures thereof.

Preferably, the impregnating agent is non-volatile, and/or substantially solvent-free. In the context of the present invention, non-volatile means that the impregnating agent has a boiling point or range higher than the temperatures at which the impregnating agent is applied to the continuous multifilament glass strand. In the context of present invention, "substantially solvent-free" means that impregnating agent contains less than 10 wt % of solvent, preferably less than 5 wt % of solvent based on the impregnating agent. In a preferred embodiment, the impregnating agent does not contain any organic solvent.

The impregnating agent may further be mixed with other additives known in the art. Suitable examples include lubricants; antistatic agents; UV stabilizers; plasticizers; surfactants; nucleation agents; antioxidants; pigments; dyes; and adhesion promoters, such as a modified polypropylene having maleated reactive groups; and any combinations thereof, provided the viscosity remains within the desired range. Any method known in the art may be used for applying the liquid impregnating agent to the continuous glass multifilament strand. The application of the liquid impregnating agent may be performed using a die. Other suitable methods for applying the impregnating agent to the continuous multifilament strands include applicators having belts, rollers, and hot melt applicators. Such methods are for example described in documents EP092191961, EP0994978B1, EP0397505B1, WO2014/053590A1 and references cited therein. The method used should enable application of a constant amount of impregnating agent to the continuous multifilament strand.

Preferably, the amount of the impregnated continuous multifilament strand is 25 to 75 wt %, for example 25 to 40 wt %, 40 to 55 wt % or 55 to 75 wt %, with respect to the sheathed continuous multifilament strand. Preferably, the total amount of the impregnated continuous multifilament strand and the polymer sheath is 100 wt % with respect to the sheathed continuous multifilament strand.

Further Aspects

The invention provides a process for the production of the glass fiber-reinforced thermoplastic polymer composition according to the invention, wherein the sheathed continuous multifilament strand is prepared by the sequential steps of
 a) unwinding from a package of the at least one continuous glass multifilament strand,
 b) applying the impregnating agent to the at least one continuous glass multifilament strand to form the impregnated continuous multifilament strand and
 c) applying the sheath of the thermoplastic polymer composition around the impregnated continuous multifilament strand to form the sheathed continuous multifilament strand.

The process for the production of the glass fiber-reinforced thermoplastic polymer composition according to the invention may further comprise the step of
 d) cutting the sheathed continuous glass multifilament strand into pellets.

The pellets may typically have a length of from 2 to 50 mm, preferably from 5 to 30 mm, more preferably from 6 to 20 and most preferably from 10 to 16 mm. The length of the glass fibers is typically substantially the same as the length of the pellet.

The total amount of the thermoplastic polymer composition and the impregnated continuous multifilament strand in the pellet is preferably at least 95 wt %, at least 98 wt %, at least 99 wt %, at least 99.9 wt % or 100 wt % with respect to the pellet.

Step d) may be followed by a step of moulding the pellets into (semi-)finished articles. Suitable examples of moulding processes include injection moulding, compression moulding, extrusion and extrusion compression moulding. Injection moulding is widely used to produce articles such as automotive exterior parts like bumpers, automotive interior parts like instrument panels, or automotive parts under the bonnet. Extrusion is widely used to produce articles such rods, sheets and pipes.

The invention also relates to a moulded article comprising or made from the glass fiber-reinforced thermoplastic polymer composition according to the invention.

In some embodiments, step c) involves applying the sheath of the thermoplastic polymer composition comprising the liquid color composition and the process comprises the step of cutting the sheathed continuous multifilament strand into pellets of the glass fiber-reinforced thermoplastic polymer composition according to the invention. One aspect of the present invention relates to such pellets. The process may further comprise the step of moulding the pellets into (semi-finished) articles.

In some embodiments, step c) involves applying the sheath of the thermoplastic polymer composition not comprising the liquid color composition and the process comprises the step of cutting the sheathed continuous multifilament strand into pellets and the step of molding the pellets and the liquid color composition into (semi-finished) articles. One aspect of the present invention relates to such articles.

It is noted that the invention relates to the subject-matter defined in the independent claims alone or in combination with any possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Materials Used

PP1: Polypropylene homopolymer with following properties: density: 905 kg/m$^3$, melt flow rate (MFR): 47 dg/min at 230° C. and 2.16 kg (test method: ISO1133), melting point: 160-175° C.

PP2: Heterophasic propylene copolymer consisting of propylene homopolymer and propylene-ethylene copolymer with following properties: density: 905 kg/m$^3$, melt flow rate (MFR): 70 dg/min at 230° C. and 2.16 kg (test method: ISO1133), melting point: 160-175° C.

GF: As continuous glass multifilament strand a glass roving containing a sizing agent, which roving has a diameter of 19 micron and a tex of 3000 (tex means grams glass per 1000 m) was used.

Impregnating agent: a highly branched polyethylene wax having density: 890-960 kg/m$^3$, dynamic viscosity: 40-58 mPa·s at 100° C. (ASTM D3236) (Dicera 13082 Paramelt)

Coupling agent: Exxelor PO1020 powder (PP-g-MA) from ExxonMobil: density: 900 kg/m$^3$, melting point: 162° C., MFR: 430 g/10 min at 230° C. and 2.16 kg (testing method: ASTM D1238)

UV stabilizer: Sabostab UV 119, a hindered amine light stabilizer (HALS) from CIBA which is commercially available from BASF.

Thermal stabilizer: Irganox® B 225 commercially available from BASF, blend of 50 wt % tris(2,4-ditert-butylphenyl)phosphite and 50 wt % pentaerythritol tetrakis[3-[3,5-di-tert-butyl-4-hydroxyphenyl]propionate]

Solid color composition: 40 wt % carbon black and 60 wt % polyethylene

Liquid color composition: commercially available Liqui-Kolor® from Audia groups, 20 wt % carbonblack, 80 wt % liquid carrier (comprising 17 wt % di-(2-ethylhexyl)adipate, 13 wt % stearic acid, 13 wt % cis-13-octadecenoic acid, 57 wt % various organic compounds having 12 or less carbon atoms, with respect to the liquid carrier)

Preparation of Sheathed Continuous Multifilament Strands (Wire-Coating)

Sheathed continuous multifilament strands were prepared using PP1, PP2, GF, impregnating agent, coupling agent, UV stabilizer and thermal stazilizer as given in Table 1 using the wire coating process as described in details in the examples of WO2009/080281A1.

TABLE 1

|  | CEx 1 | Ex 2 | Ex 3 | CEx 4 | Ex 5 | Ex 6 |
|---|---|---|---|---|---|---|
| PP1 | 65.02 | 64.32 | 63.02 | 53.01 | 52.31 | 51.01 |
| PP2 | 0.13 | 0.13 | 0.13 | 0.13 | 0.13 | 0.13 |
| GF | 30.15 | 30.15 | 30.15 | 40.2 | 40.2 | 40.2 |
| impregnating agent | 2.64 | 2.64 | 2.64 | 4 | 4 | 4 |
| coupling agent | 1.5 | 1.5 | 1.5 | 1.8 | 1.8 | 1.8 |
| UV stabilizer | 0.06 | 0.06 | 0.06 | 0.06 | 0.06 | 0.06 |
| thermal stabilizer | 0.2 | 0.2 | 0.2 | 0.2 | 0.2 | 0.2 |
| solid color | 0.6 |  |  | 0.6 |  |  |
| liquid color |  | 1.3 | 2.6 |  | 1.3 | 2.6 |
| No. of white spots | 7.2 | 1.8 | 0.3 | 7.4 | 4.1 | 1.6 |

The amounts are in wt % with respect to the total composition.

The impregnating agent was applied to GF to obtain impregnated continuous glass multifilament strand.

PP1, PP2, coupling agent, UV stabilizer and thermal stazilizer were fed to the extruder to sheath the impregnated continuous glass multifilament strand using an extruder-head wire-coating die. The sheathing step was performed in-line directly after the impregnating step. The sheathed continuous multifilament strand was cut into pellets.

The amounts of the liquid color composition were selected such that the amounts of the carbon black would be substantially the same between CEx 1 and Ex 2; and between CEx 4 and Ex 5.

The pellets and the solid color composition or the liquid color composition were fed to an injection molding device to prepare 20 plaques for each of the experiments. The plaques were observed to determine the number of white spots. The average numbers of the observed white spots are shown in Table 1.

Much less white spots were visible for the plaques prepared using the liquid color composition compared to the plaques prepared using the solid color composition. Further, a higher amount of liquid color composition led to less white spots.

The invention claimed is:

1. A glass fiber-reinforced thermoplastic polymer composition comprising a sheathed continuous multifilament strand comprising a core that extends in the longitudinal direction and a polymer sheath which intimately surrounds said core, wherein the core comprises an impregnated continuous multifilament strand comprising at least one continuous glass multifilament strand, wherein the at least one continuous glass multifilament strand is impregnated with an impregnating agent,
   wherein the polymer sheath consists of a thermoplastic polymer composition comprising a thermoplastic polymer,
   wherein the glass fiber-reinforced thermoplastic polymer composition comprises a liquid color composition comprising a pigment and a liquid carrier comprising a dicarboxylic acid ester and an unsaturated long-chain aliphatic fatty acid having 13 to 21 carbon atoms.

2. The glass fiber-reinforced thermoplastic polymer composition according to claim 1, wherein the amount of the liquid color composition in the glass fiber-reinforced thermoplastic polymer composition is 0.1 to 5.0 wt % with respect to the glass fiber-reinforced thermoplastic polymer composition.

3. The glass fiber-reinforced thermoplastic polymer composition according to claim 1, wherein the amount of the pigment in the liquid color composition is 5 to 50 wt % with respect to the liquid color composition.

4. The glass fiber-reinforced thermoplastic polymer composition according to claim 1, wherein the liquid carrier comprises the dicarboxylic acid ester.

5. The glass fiber-reinforced thermoplastic polymer composition according to claim 1, wherein the liquid carrier further comprises a saturated long-chain aliphatic fatty acid having 13 to 21 carbon atoms.

6. The glass fiber-reinforced thermoplastic polymer composition according to claim 1, wherein the liquid carrier consists of the dicarboxylic acid ester, the unsaturated long-chain aliphatic fatty acid having 13 to 21 carbon atoms, and optionally, comprises a saturated long-chain aliphatic fatty acid having 13 to 21 carbon atoms.

7. The glass fiber-reinforced thermoplastic polymer composition according to claim 1, wherein the total amount of the dicarboxylic acid ester, the saturated long-chain aliphatic fatty acid having 13 to 21 carbon atoms and the unsaturated long-chain aliphatic fatty acid having 13 to 21 carbon atoms in the liquid carrier is at least 30 wt % with respect to the liquid carrier.

8. The glass fiber-reinforced thermoplastic polymer composition according to claim 1, wherein the thermoplastic polymer composition has a melt flow index of in the range from 20 to 150 dg/min as measured according to ISO1133-1:2011 (2.16 kg/230° C.).

9. The glass fiber-reinforced thermoplastic polymer composition according to claim 1, wherein the thermoplastic polymer composition comprises at least 80 wt % of the thermoplastic polymer.

10. The glass fiber-reinforced thermoplastic polymer composition according to claim 1, wherein the amount of the glass filaments is 20 to 70 wt % with respect to the sheathed continuous multifilament strand.

11. The glass fiber-reinforced thermoplastic polymer composition according to claim 1, wherein the thermoplastic polymer composition of the polymer sheath comprises the liquid color composition.

12. The glass fiber-reinforced thermoplastic polymer composition according to claim 1, wherein the glass fiber-reinforced thermoplastic polymer composition comprises the sheathed continuous multifilament strand and further comprises the liquid color composition.

13. A moulded article comprising the glass fiber-reinforced thermoplastic polymer composition according to claim 1.

14. A process for preparing the glass fiber-reinforced thermoplastic polymer composition according to claim 1, comprising the sequential steps of:
   a) unwinding from a package of the at least one continuous glass multifilament strand,
   b) applying the impregnating agent to the at least one continuous glass multifilament strand to form the impregnated continuous multifilament strand and
   c) applying the sheath of the thermoplastic polymer composition around the impregnated continuous multifilament strand to form the sheathed continuous multifilament strand and optionally d) cutting the sheathed continuous glass multifilament strand into pellets.

15. The process of claim 14 including cutting the sheathed continuous glass multifilament strand into pellets and molding the pellets to form a molded article having a reduced number of white spots.

16. The glass fiber-reinforced thermoplastic polymer composition of claim 4 wherein the dicarboxylic acid ester is comprises di-(2-propylheptyl)adipate, di-isononyladipate, di-(2-ethylhexyl)adipate dipropylheptylphthalate or mixtures thereof.

17. The glass fiber-reinforced thermoplastic polymer composition of claim 5 wherein the saturated long-chain aliphatic fatty acid having 13 to 21 carbon atoms comprises stearic acid.

18. The glass fiber-reinforced thermoplastic polymer composition of claim 6 wherein the unsaturated long-chain aliphatic fatty acid having 13 to 21 carbon atoms comprises cis-13-octadecenoic acid.

19. The glass fiber-reinforced thermoplastic polymer composition of claim 9 wherein the thermoplastic polymer is a polyolefin.

20. The glass fiber-reinforced thermoplastic polymer composition of claim 19 wherein the polyolefin is a polypropylene, an elastomer of ethylene and a-olefin comonomer having 4 to 8 carbon atoms, or any mixtures thereof.

* * * * *